Feb. 4, 1969 M. F. BARTH 3,425,210

STEPPING DEVICE FOR TUNING FORK OSCILLATOR

Filed Jan. 18, 1967

3,425,210

STEPPING DEVICE FOR TUNING FORK OSCILLATOR

Manfred Frans Barth, Dauchingen, Germany, assignor to Kienzle Uhrenfabriken G.m.b.H., Schwenningen am Neckar, Germany, a limited-liability company of Germany Filed Jan. 18, 1967, Ser. No. 610,086
Claims priority, application Germany, Jan. 22, 1966, K 58,216
U.S. Cl. 58—23 5 Claims
Int. Cl. G04c 3/00

ABSTRACT OF THE DISCLOSURE

The prongs of a tuning fork are bridged by a toggle member in the vicinity of the nodal mount of the fork, so that vibrations of the prongs produce substantially pure linear motion of the midpoint of the member. A shift element engaging on a stepping wheel is attached to member at the midpoint of the latter.

The present invention relates to shift or stepping device for a tuning fork or similar oscillator wherein the back and forth vibrating of the tuning fork are converted to a turning and rotary movement.

It has already been shown in United States Patent No. 200,032 that the vibrations of a tuning fork may be converted to a turning movement by means of a stepping verge or anchor mounted on an end of a fork prong acting on a stepping wheel. This restriction to end mounting is necessary since, as is well known, the amplitudes of the tuning fork are relatively very small and yet movement for the verge must be relatively great. This known arrangement has the inherent disadvantage that the time constant of the tuning fork is very much impaired. Amplitude variations in the tuning fork, when such a fork and stepping wheel are used in a time piece or the like, lead to pronounced variations in the speed of the work. The stepping by such means is functionally limited to only a predetermined minimum amplitude of the tuning fork. A further disadvantage of the known arrangement is that stepping or driving power is tapped from only one of the prongs of the fork and this leads to amplified disturbances in isochronism.

It is also known that a push pawl working on a stepping wheel may be used to convert vibratory motion of the tuning fork to rotary motion. A stationary holding pawl and a push pawl mounted on the turning fork engage on a stepping wheel and the displacement of the push pawl is determined by the point of its mounting on the fork. In order to get a large displacement the push pawl is fixed near a prong end. But the further the driving point, or the position of mounting of the push pawl, is from the nodes of oscillation of the fork, so much greater are the disturbances of isochronism dependent on the stepping. In that stepping means the action on the stepping wheel is due to energy of vibration of only one prong. That same type has a further drawback in that the push pawl acquires no purely linear movement, but exhibits a circularly bent path according to the position of attachment to the prong.

An object of the present invention is to overcome the above mentioned disadvantages and especially to provide a device which will enable large amplitude and wherein the location of the energy take-off will be in the neighborhood of the node of the mechanical vibration of the tuning fork. A further object is to enable a power take-off from both prongs of the tuning fork.

These objects are attained in a stepping device wherein a tuning fork is provided with an arcuate spring blade having the ends thereof secured to the respective prongs of the tuning fork to bridge the space between the prongs. A pin is fixed on the blade spring transversely at the middle thereof, which pin carries a push-pawl to engage on a stepping wheel. Preferably the blade sping is in the neighborhood of the point of mounting of the prongs, that is, the spring ends are mounted near the nodes of vibration of the vibratory prongs. The pin and pawl may be made as an integral piece, though it is indeed possible that the pin engages in a stepping anchor in known fashion.

The arcuate blade spring functions very much as a toggle having both ends acted upon alike by the prongs and can easily produce movement of the pin of about double the amplitude of the prongs at the positions where the spring ends are mounted, and the pin is given a linear movement. Because of the resulting doubling of the amplitude, it is possible to secure the blade spring near the location of mounting the prong, that is, near the nodes of the mechanical oscillations of the oscillator.

Figure 2:
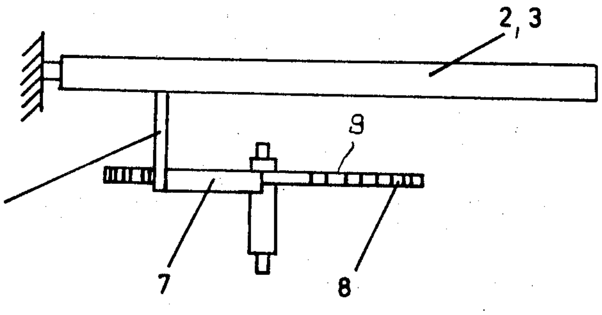
FIG. 2 is a wide view of the tuning fork of FIG. 1 with a stepping device.
Figure 1:
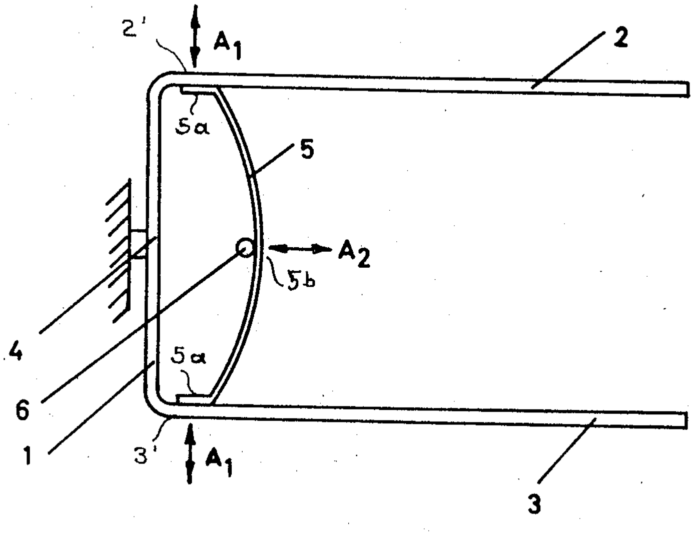
FIG. 1 is a plan of a tuning fork and shift pin.

The tuning fork 1 is shown provided with symmetrical prongs 2 and 3 and mounted at its nodal portion 4 on a suitable fixed mount. In practice the fork is usually provided with some sort of means to maintain the fork in a steady state of vibration, such as an inductor coil cooperating with armatures on the prongs and controlled by a magnetic pick-up so that the fork maintains its natural frequency. Such drive means are well-known and need not be described further and are not necessary to the understanding of the invention.

A light bowed blade spring 5 having opposite end portions *5a* secured to the prongs 2 and 3 at portions 2' and 3' equidistant from the nodal portion 4 bridges the distance between the prongs in the general neighborhood of the node of the fork.

As the prongs vibrate and the portions 2' and 3' move in and out as shown by the arrows $A_1$, then the bowed spring becomes more or less bowed, with a consequent straight line movement of the midportion *5b* of the spring in the direction $A_2$ in which the prongs generally extend. The static curvature of the blade spring largely determines the degree and nature of the linear movement of the mid portion relative to in-and-out movement of the prongs at regions 2' and 3'. Generally satisfactory results are obtained if the curve is circular and of curvature such that the motion $A_2$ is about double that at the end in the direction $A_1$. By having appreciable bend in the curve relative to its length, increasing $A_1$ will not increase $A_2$ proportionately when the prongs move inwardly.

A shift or push-pawl pin 6 is secured transversely on the mid-portion of *5b* of the spring and carries a pawl 7 moving in the direction $A_2$ acting on a rotary stepping or ratchet wheel 8 having teeth 9. The pawl may be integral with the pin if the pawl and/or pin with mount is sufficiently resilient.

The device as a whole is useful in timing devices, such as clocks, and the combination of the bowed spring with the tuning fork enables the production of substantially pure linear movement at magnified amplitude. This is a better arrangement than is that obtained by mounting the pawl on the end of a prong where the pawl, if unrestrained, tends to follow the curvature of the wheel when the latter is between the prongs to conserve space and be liable to advance the wheel and extra increment whenever the fork vibrates at greater than normal amplitudes. The present invention enables this better action due both to the linearity of movement of the pin 6 and to a lessening rate of displacement of the pin during the working stroke of the pawl as the prongs move inwardly with excessive amplitude. An extraordinary long back draw of the pawl causes no trouble if the pawl and wheel teeth are properly shaped, and the pawl is not unduly free to turn on the axis of the pin.

The invention claimed is:

1. In a shift device for obtaining turning motion from a source of oscillatory energy, a tuning fork having a pair of vibratory prongs and a nodal portion therebetween, a symmetrical toggle member having a mid-portion and having the ends of said member mounted symmetrically on the respective prongs, the mid portion of the member being out of line with the zones of attachment whereby inward and outward movement of prongs and member ends produces a rectilinear reciprocatory displacement of the mid portion substantially at right angles to the motion of the prongs, a shift pin on the mid-portion of the member perpendicular to the direction of said displacement, and movable with the mid portion, a toothed wheel axially perpendicular to said direction, and a shift element connected to the pin and generally tangential to the wheel and engageable with the teeth for causing the wheel to turn by increments up on the displacement of the said mid-portion and pin.

2. In a device as claimed in claim 1, said toggle member being an arcuately curved blade spring having the end portions thereof in substantially fixed positions relative to the respective prongs.

3. In a device as claimed in claim 2, said prongs extending from the nodal portion an appreciably greater distance than said end portions are from the nodal portion.

4. In a device as claimed in claim 3, said pin and shift element being integral.

5. In a device as claimed in claim 3 said shift element being a pawl.

References Cited

UNITED STATES PATENTS

| | | | |
|---|---|---|---|
| 3,107,481 | 10/1963 | Oram | 58—23 |
| 3,243,951 | 4/1966 | Kawakami | 58—23 |

FOREIGN PATENTS

| | | |
|---|---|---|
| 407,885 | 9/1966 | Switzerland. |

STEPHEN J. TOMSKY, *Primary Examiner.*

E. C. SIMMONS, *Assistant Examiner.*

U.S. Cl. X.R.

84—457; 331—157